Jan. 17, 1967 L. J. MATTINGLY 3,299,199
TERMINAL BOX
Filed Feb. 20, 1964
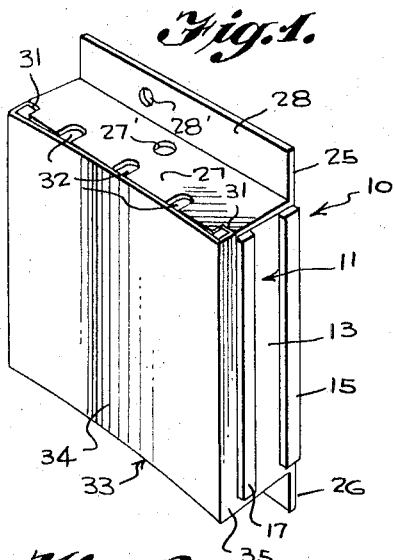
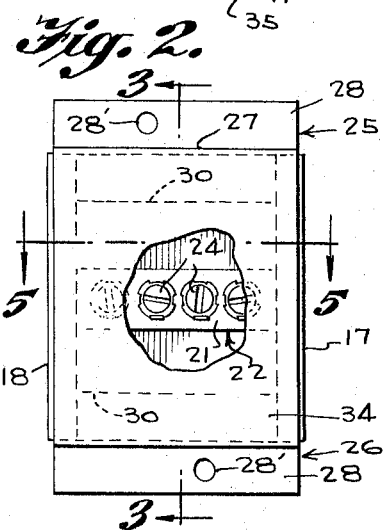
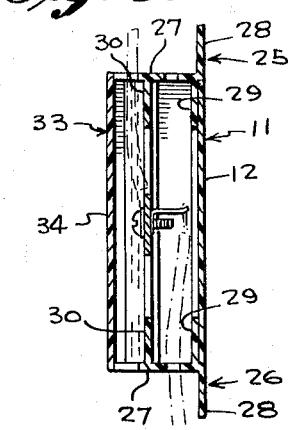
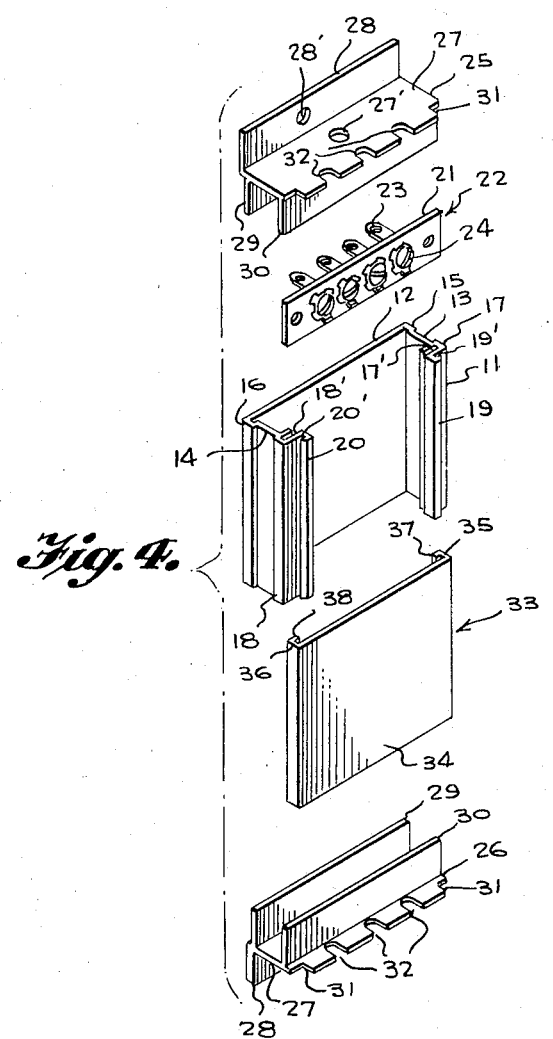
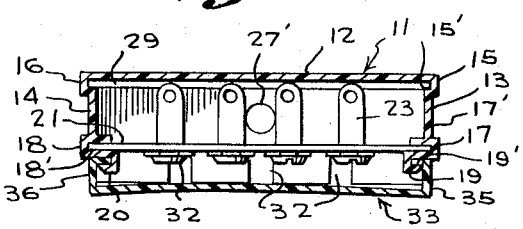
INVENTOR
LAWRENCE J. MATTINGLY
BY Mason, Fenwick & Lawrence
ATTORNEYS United States Patent Office 3,299,199
Patented Jan. 17, 1967

3,299,199
TERMINAL BOX
Lawrence J. Mattingly, Dallas, Tex., assignor, by mesne assignments, to Cadre Industries Corp., Endicott, N.Y., a corporation of New York
Filed Feb. 20, 1964, Ser. No. 346,232
5 Claims. (Cl. 174—50)

The present invention relates in general to electrical terminal boxes, and more particularly to junction boxes formed entirely of extruded plastic components for housing electrical terminal strips and associated connections in electrical circuits such, for example, as intercom systems.

An object of the present invention is the provision of a novel electrical terminal box or junction box, the housing portions of which are all formed of extruded plastic members, wherein the extruded members may be readily assembled together by slidably interfitting portions thereof with other portions of the assembly, thereby providing a relatively inexpensive and highly serviceable junction box assembly.

Another object of the present invention is the provision of a novel junction box of the type described in the immediately preceding paragraph, wherein an elongated extrusion of one specific cross-sectional configuration can be used for a plurality of components of the junction box.

Another object of the present invention is the provision of a novel junction box of the type described in the two immediately preceding paragraphs, wherein a slidably removable extruded cover member is provided to afford convenient access to an internal terminal strip or strips in the junction box.

Other objects, advantages and capabilities of the present invention will become apparent from the following detailed description, taken in conjunction with the accompanying drawing illustrating a preferred embodiment of the invention.

In the drawing:

FIGURE 1 is a perspective view of an electrical terminal box or junction box constructed in accordance with the present invention;

FIGURE 2 is a front elevation view of the junction box viewed from the cover side thereof, a portion of the cover being broken away to reveal the internal terminal strip;

FIGURE 3 is a vertical section view of the terminal box, taken along the line 3—3 of FIGURE 2.

FIGURE 4 is an exploded view of the components making up the terminal box assembly; and FIGURE 5 is a horizontal section view of the junction box taken along the line 5—5 of FIGURE 2.

Referring to the drawing, wherein like reference characters designate corresponding parts throughout the several figures, the junction box of the present invention, indicated in general by the reference character 10, comprises a generally channel-shaped body or housing member 11 formed of an elongated extrusion which may be sliced into sections of appropriate length. The housing member 11 comprises a planiform base wall 12 and a pair of opposite side walls 13, 14, projecting in a like direction in substantial parallelism from the opposite longitudinal edges of the base wall 12, the side walls 13, 14 being joined to the base wall 12 by U-shaped formations 15, 16 defining inwardly opening grooves of rectangular cross section immediately adjoining the front or adjacent surface of the base wall 12. Additional inwardly opening U-shaped formations 17 and 18 are provided at the outer or forwardmost end portions of the side walls 13, 14 to define inwardly opening grooves 17', 18' spaced like distances from the base wall 12. The outermost legs of the U-shaped formations 17, 18 terminate at their innermost edges in hook-shaped flanges 19, 20 terminating in outwardly facing beveled edges and defining outwardly opening grooves 19', 20'.

The inwardly opening grooves 17', 18' defined by the U-shaped formations 17, 18 of the housing member 11 define slideways for receiving and supporting the opposite end edges of elongated rectangular panels 21 of terminal strips, generally indicated at 22, of conventional construction. Such terminal strips customarily comprise a rectangular panel 21 of suitable insulating material, such as plastic or fiber, and support a plurality of terminal lugs 23 projecting from one face thereof and terminal screws 24 threadedly mounted in sockets provided in the upper portions of the terminal lugs to permit electrical conductor wires to be secured between the heads of the terminal screws and the adjacent head formations of the terminal lugs so as to dispose the electrical conductor wires in good electrically conductive contact with the terminal lugs.

The extrusion from which the housing member 11 is formed may be cut into sections of any desired length to accommodate the number of terminal strips 22 required for the junction box in the particular system installation. The grooves 17', 18' also serve, along with the grooves 15', 16', as interfitting slideways or mounting channels for removably holding the end members 25, 26 of the junction box in assembled relation with the housing member 11.

The end members 25 and 26 are formed of the same longitudinal plastic extrusion so that the structure of only one of the end members need be described in detail to afford an adequate understanding of the construction. The end member 25 comprises a generally planiform end wall member 27 having a base flange 28 projecting at right angles thereto from the lower edge of the end wall 27 and having a pair of parallel ribs 29, 30 projecting from the side of the end wall 27 opposite the base flange 28 in parallelism with each other, the ribs 29, 30 being spaced apart a distance corresponding to the distance between the grooves 17' and 15'. It will be apparent that the extrusion forming the end members 25, 26 may be readily cut to lengths corresponding to the distance between the base surfaces of the grooves 17', 18' and that the ribs 29, 30 can then be slidably forced into the channels formed by the grooves 15', 16' and the grooves 17', 18' to close the ends of the housing member 11. A portion of the end wall 27 of the end members 25, 26 projects above or outwardly from the plane of the rib 30 and is provided with rectangular cutouts 31 at the opposite corners thereof and with U-shaped wire accommodating recesses 32 in the intermediate portions thereof, the latter to permit passage of the insulating covering portion of the electrical conductive wires to be led into the junction box.

The cover of the junction box, generally indicated by the reference character 33, is a simple channel-shaped extrusion having a planiform top wall 34, shallow side walls or flanges 35, 36 and inwardly projecting lips 37, 38 on the ends of the side walls 35, 36. The lips 37, 38 are of a cross section corresponding to the cross sections of the outwardly opening grooves 19', 20' defined by the hook-shaped flanges 19, 20 to permit the cover member 33 to either be slidably fitted onto the housing member 11 or to be forced rearwardly into interlocked relation with the housing member 11 by camming action of the lips 37, 38 over the beveled edges of the hook-shaped flange formations 19, 20. The cover member 33 is extruded from a suitable plastic material which may be identical to the material from which the housing member 11 and end members 25, 26 are extruded.

The assembly of the junction box formed by these components will be apparent from the foregoing description. The terminal strips 22 are slidably inserted into position in the housing member 11 by fitting the opposite edges of the terminal strip panels 21 into the grooves 17', 18', and the end members 25, 26 are then assembled in end-closing relation to the housing member 11 by fitting the ribs 29, 30 into the grooves 15', 16' and 17', 18', and forcing the end members inwardly toward the center of the housing member 11 until the end wall 27 butts against the adjacent edges of the side walls 13, 14. The lead wires may then be secured in position by the terminal screws 24, other conductors having been already connected as by soldering to the terminal lugs 23 and led outwardly through the opening 27' in the end wall 27. The cover 33 is then assembled onto the subassembly of housing member 11 and end members 25, 26 by fitting the lips 37, 38 in the grooves 19', 20'. Suitable mounting screw openings, one of which is indicated at 28', are provided in the base flange 28 of the end members 25, 26 to facilitate mounting of the junction box on an appropriate supporting surface.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. An electrical terminal box for removably supporting terminal strip panels therein comprising an elongated, substantially channel shaped body member having a planiform base wall and side walls extending substantially perpendicular from opposite lateral edges thereof, said side walls having slide groove portions opening inwardly of the side walls and through the opposite longitudinal ends of said side walls lying in two spaced planes paralleling the base wall, the slide groove portion in one of said planes extending continuously from end to end longitudinally of said side walls for slidably receiving opposite edge portions of the terminal strip panels to support the same between said side walls, removable end members for closing the longitudinal ends of said body member each having an end wall extending generally perpendicular to said base wall and said side walls and a pair of rib-like projections extending from said end wall along said pair of parallel planes having edge portions conforming closely to the configuration of said slide groove portions slidably interfitted in said slide groove portions of said side walls in frictionally retained relation therein, a cover member forming a removable closure spanning the space between the edges of said side walls remote from said base wall, and means for removably interlocking said cover member with the remote edges of said side walls.

2. An electrical terminal box for removably supporting terminal strip panels therein comprising an elongated channel shaped body member having a substantially rectangular planiform base wall and side walls extending perpendicular from opposite lateral edges thereof defining a chamber therebetween, said side walls each having a pair of inwardly opening continuous grooves extending from end to end longitudinally thereof and lying in a first plane immediately adjacent said base wall and a second plane spaced therefrom paralleling said first plane and said base wall, the grooves in one of said planes being adapted to slidably receive opposite edge portions of the terminal strip panels to support the same in said chamber, removable end members for closing the longitudinal ends of said chamber defined by said body member each having an end wall spanning the distance between said side walls and extending generally perpendicular to said base wall and said side walls, said end members having a pair of rib-like projections extending from said end wall along said pair of parallel planes and slidably interfitted in said grooves of said side walls in frictionally retained relation therein, a cover member forming a removable closure spanning the space between the edges of said side walls remote from said base wall having a substantially rectangular planiform cover wall paralleling said base wall, and means for removably interlocking said cover member with the remote edges of said side walls.

3. An electrical terminal box for removably supporting terminal strip panels therein comprising an elongated channel shaped body member formed of a single plastic extrusion having a substantially rectangular planiform base wall and side walls extending perpendicularly from opposite lateral edges thereof defining a chamber therebetween, said side walls each having a pair of inwardly opening continuous grooves extending from end to end longitudinally thereof and lying in a first plane immediately adjacent said base wall and a second plane spaced therefrom paralleling said first plane and said base wall, the grooves in one of said planes being adapted to slidably receive opposite edge portions of the terminal strip panels to support the same in said chamber, removable end members formed from a single plastic extrusion for closing the longitudinal ends of said chamber defined by said body member each having an end wall spanning the distance between said side walls and extending generally perpendicular to said base wall and said side walls, said end members having a pair of rib-like projections extending continuously between said side walls from said end wall along said pair of parallel planes and slidably interfitted in said grooves of said side walls in frictionally retained relation therein, a cover member formed of a plastic extrusion forming a removable closure spanning the space between the edges of said side walls remote from said base wall having a substantially rectangular planiform cover wall paralleling said base wall, and means for removably interlocking said cover member with the remote edges of said side walls.

4. An electrical terminal box for removably supporting terminal strip panels therein comprising an elongated channel shaped body member formed of a single plastic extrusion having a substantially rectangular planiform base wall and side walls extending perpendicularly from opposite lateral edges thereof defining a chamber therebetween, said side walls each having a pair of inwardly opening continuous grooves extending from end to end longitudinally thereof and lying in a first plane immediately adjacent said base wall and a second plane spaced therefrom paralleling said first plane and said base wall, the grooves in one of said planes being adapted to slidably receive opposite edge portions of the terminal strip panels to support the same in said chamber, removable end members formed from a single plastic extrusion for closing the longitudinal ends of said chamber defined by said body member each having an end wall spanning the distance between said side walls and extending generally perpendicular to said base wall and said side walls, said end members having a pair of rib-like projections extending continuously between said side walls from said end wall along grooves of said side walls in frictionally retained relation therein, said side walls of said body member additionally having hook shaped lip portions extending continuously along the edges thereof remote from said base wall defining outwardly opening continuous grooves lying in a third plane paralleling and spaced further from said base wall than said second plane, and a cover member formed of a plastic extrusion providing a removable closure for said chamber having a substantially channel shaped cross section and including a substantially rectangular planiform cover wall conforming substantially to said base wall and paralleling the same and flange walls projecting from the lateral edges of said cover wall toward said base wall terminating in inwardly directed retaining lips slidably interfitted in the outwardly opening grooves of said hook shaped lip portions of said side walls to removably interlock said cover member therewith.

5. In an electrical terminal box, the combination defined in claim 4 wherein said end members additionally include a base flange projecting oppositely from said end wall relative to said rib-like projections from the edge thereof adjacent said base wall in planar alignment with said base wall to provide mounting flanges for securing the terminal box to a supporting surface.

References Cited by the Examiner

UNITED STATES PATENTS 3,180,697 4/1965 Mulch _____ 222—41 X

FOREIGN PATENTS 505,840 5/1939 Great Britain.

LARAMIE E. ASKIN, *Primary Examiner.*

H. W. COLLINS, *Assistant Examiner.*